(12) United States Patent
Cai et al.

(10) Patent No.: US 10,924,558 B2
(45) Date of Patent: Feb. 16, 2021

(54) NETWORK FUNCTION INFORMATION INTERACTION METHOD AND DEVICE, AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Hui Cai, Beijing (CN); Tao Sun, Beijing (CN); Dan Wang, Beijing (CN); Chao Liu, Beijing (CN)

(73) Assignees: China Mobile Communication Co., Ltd. Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/496,000

(22) PCT Filed: Jan. 16, 2018

(86) PCT No.: PCT/CN2018/072907
§ 371 (c)(1),
(2) Date: Sep. 20, 2019

(87) PCT Pub. No.: WO2018/171316
PCT Pub. Date: Sep. 27, 2018

(65) Prior Publication Data
US 2020/0028921 A1 Jan. 23, 2020

(30) Foreign Application Priority Data
Mar. 20, 2017 (CN) .......................... 201710167061.0

(51) Int. Cl.
*G06F 15/177* (2006.01)
*H04L 29/08* (2006.01)

(52) U.S. Cl.
CPC ............ *H04L 67/16* (2013.01); *H04L 67/303* (2013.01)

(58) Field of Classification Search
CPC .............................. H04L 67/16; H04L 67/303
(Continued)

(56) References Cited

U.S. PATENT DOCUMENTS

| 8,843,997 B1 | 9/2014 | Hare |
| 2010/0048161 A1 | 2/2010 | He et al. |

(Continued)

FOREIGN PATENT DOCUMENTS

| CN | 1881915 A | 12/2006 |
| CN | 101094224 A | 12/2007 |

(Continued)

OTHER PUBLICATIONS

International Search Report issued in PCT/CN2018/072907, dated Mar. 27, 2018.
(Continued)

*Primary Examiner* — Wing F Chan
*Assistant Examiner* — Joseph R Maniwang
(74) *Attorney, Agent, or Firm* — BakerHostetler

(57) ABSTRACT

An NF information interaction method and device. The method comprises: a network function library NRF receiving a service discovery request sent by an NF requesting party, wherein the service discovery request at least comprises a service identifier requested to be provided by the NF requesting party; performing querying according to the service identifier, and determining an NF providing party of a service requested to be provided by the NF requesting party and service-related information about the NF provid-
(Continued)

ing party; and sending the service-related information about the NF providing party and the service-related information to the NF requesting party by means of a service discovery response.

20 Claims, 8 Drawing Sheets

(58) Field of Classification Search
USPC .......................................................... 709/220
See application file for complete search history.

(56) References Cited

U.S. PATENT DOCUMENTS

| | | |
|---|---|---|
| 2011/0093564 A1 | 4/2011 | Li et al. |
| 2015/0341448 A1 | 11/2015 | Li et al. |
| 2020/0275302 A1* | 8/2020 | Youn ..................... H04W 28/24 |

FOREIGN PATENT DOCUMENTS

| | | |
|---|---|---|
| CN | 101352021 A | 1/2009 |
| CN | 101931976 A | 12/2010 |
| CN | 103095587 A | 5/2013 |

OTHER PUBLICATIONS

English translation of Written Opinion issued in PCT/CN2018/072907, dated Mar. 27, 2018.

* cited by examiner

NETWORK FUNCTION INFORMATION INTERACTION METHOD AND DEVICE, AND COMPUTER STORAGE MEDIUM

CROSS-REFERENCE TO RELATED APPLICATION

The present application is a National Stage of International Patent Application No. PCT/CN2018/072907, filed Jan. 16, 2018, and claims priority to Chinese Patent Application No. 201710167061.0, filed on Mar. 20, 2017, the disclosures of which are hereby incorporated by reference in their entirety.

TECHNICAL FIELD

The disclosure relates to the technical field of networks, and in particular, to a method for interaction of network function (NF) information and a computer storage medium.

BACKGROUND

Under a service-based architecture (SBA), network service, as one of many services, is used to provide network connections or network-related services. A network repository function (NRF) device is provided in the SBA. The NRF device may discover various network services providable by an NF provider.

However, there is currently no solution for how an NRF manages an NF and how to assist an NF requester to obtain a desired NF.

SUMMARY

In view of this, the embodiments of the disclosure are directed to a method and device for interaction of NF information, and a computer storage medium, which can at least partially solve the above problems.

In order to achieve the above object, the technical solution of the disclosure is implemented as follows.

A first aspect provides a method for interaction of NF information, which may include that:

an NRF receives a service discovery request from an NF requester; here, the service discovery request at least includes a service identifier (ID) of a service requested by the NF requester;

the NRF queries, based on the service ID, for at least one of an ID of an NF provider capable of providing the service requested by the NF requester or service-related information of the NF provider capable of providing the service requested by the NF requester; here, the service-related information is to indicate related information of a plurality of services provided by the NF provider; and the NRF sends at least one of the ID of the NF provider or the service-related information to the NF requester through a service discovery response.

A second aspect provides a method for interaction of NF information, which may include that:

an NF requester sends a service discovery request to an NRF; here, the service discovery request at least includes a service ID of a service requested by the NF requester;

the NF requester receives at least one of an ID or service-related information of an NF provider, which is returned by the NRF based on the service discovery request; here, the service-related information is to indicate related information of a plurality of services provided by the NF provider;

the NF requester sends a service request to the NF provider based on at least one of the ID or the service-related information of the NF provider; and the NF requester receives a service response returned by the NF provider based on the service request.

A third aspect provides a device for interaction of NF information, which may be applied to an NRF and may include that:

a first receiving unit, configured to receive a service discovery request from an NF requester; here, the service discovery request at least includes a service ID of a service requested by the NF requester;

a determination unit, configured to query, based on the service ID, for at least one of an ID of an NF provider capable of providing the service requested by the NF requester or service-related information of the NF provider capable of providing a service requested by the NF requester; here, the service-related information is to indicate related information of a plurality of services provided by the NF provider; and a first sending unit, configured to send at least one of the ID of the NF provider or the service-related information to the NF requester through a service discovery response.

A fourth aspect provides a device for interaction of NF information, which may be applied to an NF requester and may include that:

a second sending unit, configured to send a service discovery request to an NRF; here, the service discovery request at least includes a service ID of a service requested by the NF requester; and a second receiving unit, configured to receive at least one of an ID or service-related information of an NF provider, which is returned by the NRF based on the service discovery request; here, the service-related information is to indicate related information of a plurality of services provided by the NF provider.

The second sending unit may be further configured to send a service request to the NF provider based on at least one of the ID or the service-related information of the NF provider.

The second receiving unit may be further configured to receive a service response returned by the NF provider based on the service request.

A fifth aspect provides a computer storage medium, having computer executable instructions stored therein. The computer executable instructions may be used in performing the NF information interaction method provided by the first aspect or the second aspect.

According to the method and device for interaction of NF information and the computer storage medium provided by the embodiments of the disclosure, an NF requester may send a service discovery request to an NRF, for requesting at least one of an ID of an NF provider capable of providing a service required by the NF requester or service-related information of all available services at the NF provider capable of providing the service required by the NF requester, thereby making it convenient for the NF requester to obtain a corresponding service using the received ID of the NF provider. In a subsequent process, by locally querying the service-related information of the NF provider without access to the NRF, the NF requester may determine that the NF provider can provide a desired service or NF version information corresponding to the desired service, thereby improving the rate at which the NF requester acquires a service.

DETAILED DESCRIPTION

The technical solutions of the disclosure are further elaborated below in conjunction with the drawings and specific embodiments.

Figure 1:
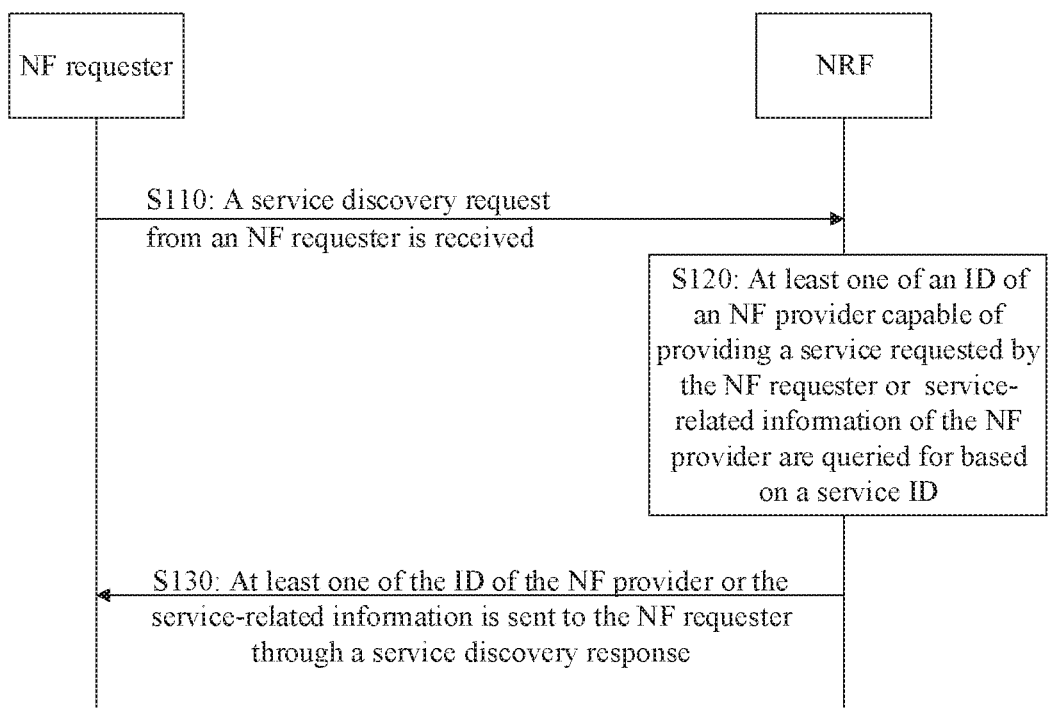
FIG. 1 is a flow diagram of a first method for interaction of NF information according to an embodiment of the disclosure.

As illustrated in FIG. 1, the present embodiment provides a method for interaction of NF information, which includes the following operations.

At block S110, an NRF receives a service discovery request sent by an NF requester. Here, the service discovery request at least includes a service identifier (ID) of a service requested by the NF requester.

At block S120, the NRF queries, based on the service ID, for at least one of an ID of an NF provider capable of providing the service requested by the NF requester or service-related information of the NF provider capable of providing the service requested by the NF requester. The service-related information is to indicate related information of a plurality of services provided by the NF provider.

At block S130, the NRF sends at least one of the ID of the NF provider or the service-related information to the NF requester through a service discovery response.

The NF information interaction method described in the present embodiment is a method applied to an NRF device. In the present embodiment, before operations S110 to S130 are performed, the NRF device obtains an ID of each of NF providers and service-related lists of NFs providable by the NF providers through discovery capabilities of NFs. Here, the service-related information includes at least one of a service ID list or NF version information of the NF provider. The service ID list includes service IDs of all available services at the NF provider. The NF version information is to indicate versions of the services provided by the NF provider. The version information here may be a version number or a version name of each of services provided by the NF provider. Certainly, the service-related information may further include, besides a service ID and a service version, other information, for example, description information of each service. The NF requester may determine whether the service is desired by the NF requester through the description information.

In this case, if a service discovery request carrying a service ID of a service requested by the NF requester is received from the NF requester, the NF providers capable of providing a service requested by the NF requester can be determined by querying the service ID list. On the other hand, the NF requester may also determine whether the NF provider can provide a desired service version for the NF requester by querying the service-related information.

In some embodiments, after discovering various NFs providable by each NF provider, the NRF device establishes a mapping relationship between the service ID of each NF and the ID of the NF provider through data filtering and the like. In this case, after the NRF device receives the service discovery request, the NRF device may quickly determine the NF providers capable of providing the service requested by the NF requester by querying the mapping relationship.

The ID of the NF provider may be various identification information of the NF provider, for example, information capable of uniquely identifying a name or serial number of the NF provider such as a domain name or an internet protocol (IP) address or a server name of a server. The ID of the NF provider here may also be a type ID of the NF provider, and the like.

The NF in the present embodiment may include a service for acquiring user data, a user data change notification service, a user terminal registration and NF providing service, a notification service for changing a network service provided by a terminal, a service for acquiring a network service provided by a UE, a terminal reachable notification, a user data purifying service, etc. Here are a few examples provided for the NF, but the actual process is not limited to these examples.

After the NRF queries that the service requested by the NF requester can be provided by an NF provider, the NRF provides the NF requester with the ID of the NF provider. The ID of the NF provider may be used for the NF requester to directly or indirectly access the NF provider, thereby obtaining a corresponding NF. In the present embodiment, a service ID list of the NFs providable by the NF provider may also be sent to the NF requester. In this case, the NF requester will receive a service ID list of all available NFs at the NF provider. After receiving the service discovery response, the NF requester stores the service ID list, so that if the NF requester needs the NF next time, it can be queried whether the locally stored service ID list has a corresponding NF service ID. If there is a corresponding NF service ID in the locally stored service ID list, it is considered that the NF provider can provide the corresponding NF. The NF provider may be accessed again by the NF requester based on the ID of the NF provider previously received from the NRF, and it is requested to provide the NF required by the NF requester. In this case, the number of times for which the NF requester sends the service discovery request to the NRF is reduced, and therefore the workload of the NRF can be reduced. Thus, a large delay of a corresponding service obtained by the NF requester caused by the slowness of related information returned to the NF requester and the NF provider due to over-load of the NRF is reduced.

In some embodiments, the service discovery request further includes predetermined information. The predetermined information includes related information of the NF provider. The related information of the NF provider includes at least one of a type of the NF provider or a type of a network slicing to which the NF provider belongs.

The operation illustrated in block S120 may include that: an NF provider capable of providing a service requested by the NF requester and matching related information of the NF provider is determined based on the service ID and the type of the NF provider.

The NF providers capable of providing various NFs in the present embodiment may be classified into various types, but the NF required by the NF requester is preferably provided by a specific type of NF provider. Therefore, at this time, the NF requester may carry the type of the required NF provider in the service discovery request. The type here indicates the type of an NF provider. In this case, the NRF will provide the type of NF provider required by the NF requester.

In some embodiments, the service discovery request further includes predetermined information. The predetermined information includes at least one of related information of the NF requester or related information of user equipment (UE) connected to the NF requester. The related information of the NF requester includes at least one of an ID of the NF requester, a type of the NF requester, or a type of a network slicing to which the NF requester belongs.

The related information of the UE includes at least one of an ID of the UE, a type of the UE, a type of network slicing to which the UE is connected, an ID of a network slicing which the UE is connected, an ID of a home public land mobile network (HPLMN) where the UE is located, a name of a data network to which the UE is connected, or an ID of a data network to which the UE is connected.

The type of the UE may include: an enhanced mobile broadband terminal and an internet of things (IOT) terminal.

Correspondingly, the operation illustrated in block S120 may include that: an NF provider capable of providing a service requested by the NF requester and matching at least one of a capability or requirement of the NF requester is queried based on the service ID and the related information of the NF requester.

In the present embodiment, related information of the NF requester is carried. The related information of the NF provider may include an ID of the NF requester or a type of the NF requester. In the present embodiment, the type of the NF requester may include multiple types. For example, the NF requester may be classified according to types, and may include: a core access and mobility management function (AMF), a session management function (SMF) and an authentication server function (AUSF). The network capabilities and network requirements of different types of NF requesters are different. It may be necessary for a specific type of NF provider to provide an NF, or a specific NF provider in the same type may be required to provide an NF. In the present embodiment, the NRF may also determine the type of the NF provider based on the ID of the NF provider, or search for the NF provider supported or required by the NF requester by using the ID of the NF provider.

In some embodiments, the service discovery request further includes related information of UE. The related information of the UE may further include related information of UE connected to the NF requester. The related information of the UE includes at least one of an ID of the UE or a type of the UE. In the present embodiment, the NF requester is connected with the UE, and needs to provide a corresponding service for the UE. Therefore, in the present embodiment, the related information of the UE with which the NF requester is connected may be carried in the service discovery request sent by the NF requester. The related information of the UE here may include at least one of the identifier (ID) of the UE or the type of the UE. The ID of the UE here may be a device ID of the UE, such as an international mobile equipment identity (IMEI) or a communication ID of the UE. The communication ID here may be a mobile phone number used by the UE or a tunnel ID. The type of the UE may be used to indicate which type the UE belongs to, for example, the UE is a 4G terminal or a 3G terminal or the like. The network capabilities and network requirements of different UEs or different types of UEs are different. Therefore, in the present embodiment, the service discovery request carries related information of the UE, so that the NRF is convenient to select an NF provider that is suitable for at least one of the capability or requirement of the UE.

Specifically, the operation illustrated in block S120 may include that: an NF provider capable of providing a service requested by the NF requester and matching at least one of a capability or requirement of the UE is queried based on the service ID and the related information of the NF requester.

Figure 2:
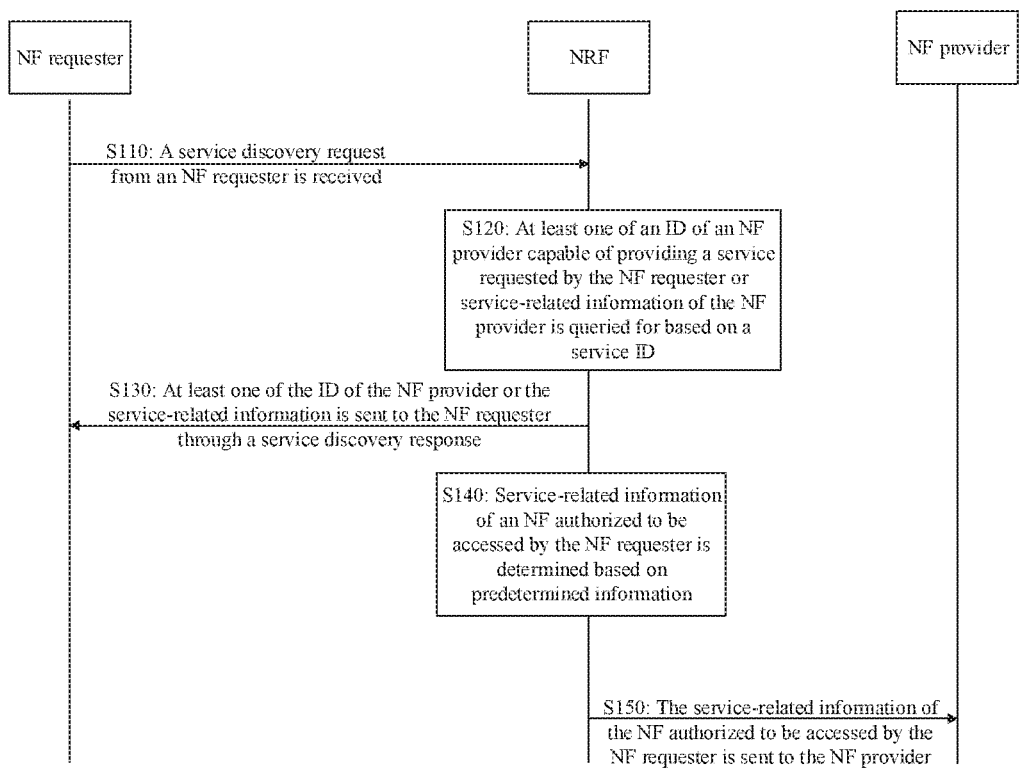
FIG. 2 is a flow diagram of a second method for interaction of NF information according to an embodiment of the disclosure.

In some embodiments, as illustrated in FIG. 2, the method further includes the following operations.

At block S140, service-related information of an NF authorized to be accessed by the NF requester is determined based on the predetermined information. The service-related information of the NF authorized to be accessed by the NF requester is used for the NF provider to determine whether the service requested by the NF requester is an authorized service.

At block S150, the service-related information of the NF authorized to be accessed by the NF requester is sent to the NF provider.

In the present embodiment, the NRF further determines, according to the related information of the NF requester or the UE, which NFs are authorized to be accessed or used by the NF requester, and forms service-related information of NFs authorized to be accessed by the NF requester. The service-related information of the NFs authorized to be accessed by the NF requester may include at least one of a service ID list or NF version information of NFs allowable to be accessed by the NF requester. The service-related information of the NF authorized to be accessed by the NF requester is sent to the NF provider. In this case, after receiving the corresponding service ID list, the NF provider determines, according to the service ID list of the NFs authorized to be accessed by the NF requester, whether an NF requested to be accessed by a current NF requester is an NF allowed to be accessed or authorized to be accessed by the NF requester, and therefore the random access of an unauthorized NF is reduced, thereby implementing the management of the NFs of the NF requester.

In some embodiments, operation illustrated in block S130 may include that: the NRF sends a fully qualified domain name (FQDN) of the NF provider and the service-related information to the NF requester through a service discovery response. The FQDN here may be used for the NF requester to acquire an IP address of the NF provider in a domain name resolution manner, thereby accessing to the corresponding NF provider using the IP address.

In the present embodiment, the FQDN at least includes a network ID of a service requested by the NF requester. Typically, the FQDN also includes fields of protocols with which it complies, for example, "3GPP.org" and the like.

In the present embodiment, the FQDN at least includes a service ID. In some other scenarios, the FQDN includes, in addition to the service ID, a type of the NF provider, an ID of the NF provider, a type of UE connected to the NF requester, an ID of the UE, and an HPLMN ID of the UE.

Several information formats for the FQDN are provided below:

| Format ID | Included variable field | Fixed field |
|---|---|---|
| 1 | Service ID of NF | 3GPP.org (end field) |
| 2 | Service ID of NF and ID of HPLMN of UE connected to NF requester | 3GPP.org (end field) |
| 3 | Terminal type of UE connected to NF requester, service ID of NF, and ID of HPLMN of UE (Note: the order of the three fields in the FQDN can be arbitrary) | 3GPP.org (end field) |
| 4 | Terminal ID of UE connected to NF requester, service ID of NF, and ID of HPLMN of UE (Note: the order of the three fields in the FQDN can be arbitrary); ID of UE here may be communication number of UE, e.g., mobile phone number, and equipment ID of UE such as IMEI, and ID of network slicing to which UE is connected | 3GPP.org (end field) |
| 5 | Type of NF provider, and service ID of NF | 3GPP.org (end field) |
| 6 | ID of NF provider, and service ID of NF | 3GPP.org (end field) |

PLMN in the above table is an abbreviation of a home public land mobile network where the UE is located. The service ID of the NF is a service ID of a service requested by the NF requester.

After receiving the FQDN, the NF requester may obtain the IP address of the NF provider by using a local domain name resolution or a remote domain name resolution, so that the NF provider can be easily accessed to obtain the NF required by the NF requester. In the remote domain name resolution manner, the IP address is queried from a domain name service system.

Certainly, in some embodiments, the ID of the NF provider directly sent to the NF requester in operation S130 is an IP address of the NF provider.

Figure 3:
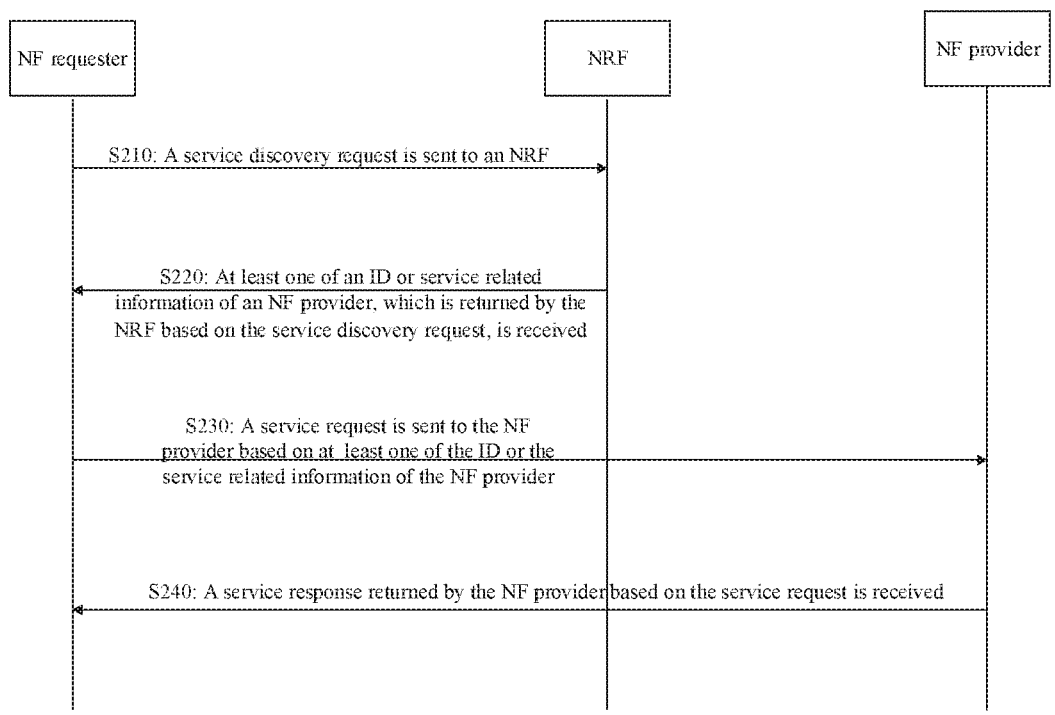
FIG. 3 is a flow diagram of a third method for interaction of NF information according to an embodiment of the disclosure.

As illustrated in FIG. 3, the present embodiment provides a method for interaction NF information, which includes the following operations.

At block S210, an NF requester sends a service discovery request to an NRF. The service discovery request at least includes a service ID of a service requested by the NF requester.

At block S220, the NF requester receives at least one of an ID or service-related information of the NF provider, which is returned by the NRF based on the service discovery request. The service-related information is to indicate related information of a plurality of services provided by the NF provider.

At block S230, the NF requester sends a service request to the NF provider according to at least one of the ID or the service-related information of the NF provider.

At block S240, the NF requester receives a service response returned by the NF provider based on the service request.

The present embodiment provides an NF information interaction method. The method may be applied to an NF requester. When needing to obtain an NF, the NF requester first requests, through a service discovery request, an NRF to query which NF providers can provide corresponding services. After the service discovery request is sent, the NF requester receives an ID of a service provider and a service ID list provided by the NRF.

At block S230, the IP address of the NF provider may be obtained in a domain name resolution manner based on the ID of the NF provider. Certainly, the ID of the NF provider may be the IP address of the NF provider. Thus, in operation S230, the NF requester may access the NF provider based on the obtained IP address of the NF provider, thereby obtaining a corresponding NF.

In the present embodiment, the NF requester obtains service-related information sent by the NRF while receiving an ID of a service provider provided by the NRF. The service-related information may include at least one of a service ID list or NF version information. The service ID list includes service IDs of all NFs provided by the NF provider. The NF version information is to indicate versions of services provided by the NF provider. In the present embodiment, after receiving the service ID list, the NF requester correspondingly stores the ID of the NF provider and the service ID list. Without sending a service discovery request to the NRF, the NF requester may conveniently determine an ID of an NF provider of a desired NF subsequently by querying a local service ID list, so as to access a corresponding NF provider.

Operation S210 in the present embodiment may specifically include that: the service discovery request is sent to the NRF when the NF requester does not query an NF provider that provides a corresponding NF in a locally stored service ID list.

In some embodiments, operation S230 may include that: an IP address of the NF provider is acquired according to the ID of the NF provider; and the service request is sent to the NF provider based on the determined IP address.

In some embodiments, if the ID of the NF provider is an IP address of the NF provider, then in operation S230, the NF requester may directly access the NF provider according to the IP address, thereby obtaining a corresponding NF.

In some embodiments, the service discovery request further includes predetermined information. The predetermined information includes at least one of related information of the NF provider, related information of the NF requester, or related information of UE connected to the NF requester.

The related information of the NF provider includes at least one of a type of the NF provider or a type of a network slicing to which the NF provider belongs. The related information of the NF provider is used for the NRF to select an NF provider matching the related information of the NF provider.

The related information of the NF requester includes at least one of an ID of the NF requester, a type of the NF requester and a type of a network slicing to which the NF requester belongs. The related information of the NF requester is used for the NRF to perform at least one of selecting an NF provider capable of providing a service for the NF requester and matching at least one of a capability or requirement of the NF requester, or determining service-related information of an NF authorized to be accessed by the NF requester. The service-related information of the NF authorized to be accessed by the NF requester is used for the NF provider to determine whether the service requested by the NF requester is an authorized service.

The related information of the UE includes at least one of an ID of the UE, a type of the UE, a type of a network slicing to which the UE is connected, an ID of a network slicing to which the UE is connected, an ID of an HPLMN where the UE is located, a name of a data network to which the UE is connected, or an ID of a data network to which the UE is connected. The related information of the UE is used for the NRF to select an NF provider capable of providing a service requested by the NF requester and matching at least one of a capability or requirement of the UE.

Figure 4:
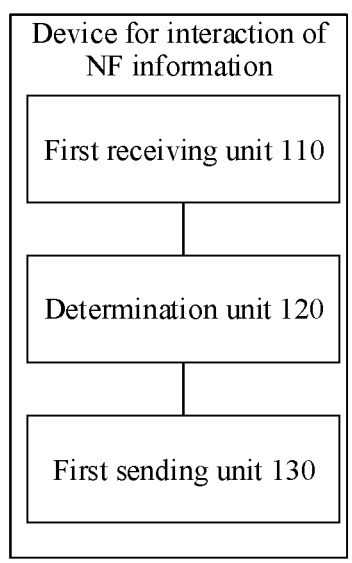
FIG. 4 is a structural diagram of a first device for interaction of NF information according to an embodiment of the disclosure.

As illustrated in FIG. 4, the present embodiment provides a device for interaction NF information, which is applied to an NRF and includes a first receiving unit 110, a determination unit 120 and a first sending unit 130.

The first receiving unit 110 is configured to receive a service discovery request sent by an NF requester. The service discovery request at least includes a service ID of a service requested by the NF requester.

The determination unit 120 is configured to query, based on the service ID, for at least one of an ID of an NF provider capable of providing a service requested by the NF requester or service-related information of the NF provider capable of providing the service requested by the NF requester. The service-related information is to indicate related information of a plurality of services provided by the NF provider.

The first sending unit 130 is configured to send at least one of the ID of the NF provider or the service-related information to the NF requester through a service discovery response.

A service information interaction device provided in the present embodiment may be an information processing device applied to an NRF. The NRF here may correspond to a single server, or may correspond to a server cluster formed by connecting a plurality of servers.

In the present embodiment, the first receiving unit 110 may correspond to a communication interface of the NRF. The communication interface may perform information interaction with an NF provider.

The determination unit 120 may correspond to a processor or processing circuit of the NRF. The processor may include a central processing unit (CPU), a micro control unit (MCU), a digital signal processor (DSP), an application processor (AP), or a programmable logic controller (PLC), and the like. The processing circuit may include an application specific integrated circuit (ASIC).

The processor or processing circuit may implement the above determination operation by execution of an executable application or program. In some embodiments, the NRF includes a database in which an ID of each NF provider and a corresponding service ID list are stored. In still other embodiments, the NRF database further stores a mapping relationship between each NF and an ID of an NF provider capable of providing the NF, such that the determination unit 120 may simply query the mapping relationship when querying an NF provider capable of providing a service requested by an NF requester. After querying the corresponding NF provider, a service ID list of the corresponding NF provider may be acquired by using an ID of the corresponding NF provider, so as to accelerate the sending of the service discovery response to the NF requester.

Optionally, the service-related information includes at least one of a service ID list or NF version information of the NF provider. The service ID list includes service IDs of all available services at the NF provider. The NF version information is to indicate versions of the services provided by the NF provider.

In some embodiments, the service discovery request further includes predetermined information. The predetermined information includes related information of the NF provider. The related information of the NF provider includes at least one of a type of the NF provider or a type of a network slicing to which the NF provider belongs.

The determination unit 120 is specifically configured to determine, based on the service ID and the type of the NF provider, an NF provider capable of providing a service requested by the NF requester and matching related information of the NF provider.

In some embodiments, the NF requester requires that the type of an NF provider providing an NF for the NF requester is a specific type, so in the present embodiment, the service discovery request includes information of describing the type of an NF provider desired by the NF requester.

In this case, after receiving the service discovery request, the NRF queries, according to the type of the NF provider in the service discovery request, an NF provider that can provide an NF desired by the NF requester and is in the type of the NF provider required by the NF requester.

In some embodiments, the service discovery request further includes predetermined information. The predetermined information includes at least one of related information of the NF requester or related information of a UE connected to the NF requester. The related information of the NF requester includes at least one of an ID of the NF requester, a type of the NF requester, or a type of a network slicing to which the NF requester belongs. The related information of the UE includes at least one of an ID of the UE, a type of the UE, a type of a network slicing to which the UE is connected, an ID of a network slicing to which the UE is connected, an ID of an HPLMN where the UE is located, a name of a data network to which the UE is connected, or an ID of a data network to which the UE is connected.

The determination unit 120 is configured to query, based on the service ID and the related information of the NF requester, an NF provider capable of providing a service requested by the NF requester and matching the predetermined information.

The predetermined information here may be information describing the NF provider itself, or related information describing the UE connected to the NF provider.

Different types of NF requesters and/or UEs connected to the same NF requester may have different network capabilities and service requirements. Therefore, in the present embodiment, the determination unit 120 conveniently selects, based on the predetermined information carried in the service discovery request, one or more NF providers matching the predetermined information from a number of NF providers capable of providing an NF of a service requested by the NF requester.

In some embodiments, the determination unit 120 is further configured to determine, based on the predetermined information, service-related information of an NF authorized to be accessed by the NF requester. The service-related information of the NF authorized to be accessed by the NF requester is used for the NF provider to determine whether the service requested by the NF requester is an authorized service. The first sending unit 130 is further configured to send the service-related information of the NF authorized to be accessed by the NF requester to the NF provider.

In the present embodiment, the determination unit 120 further determines, based on the predetermined information, service-related information such as at least one of a service ID list or a version information table that can be authorized to be accessed by the NF requester, and the first sending unit 130 sends the service-related information to the NF provider, so that when receiving the service request of the NF requester, the NF provider may determine according to the service ID list, whether to allow the NF requester to acquire the NF, thereby implementing the management of services provided by the NF provider, providing management for the NF requesting of the NF requester, and implementing orderly management of NF provision.

In some embodiments, the first sending unit 130 is configured to send an FQDN of the NF provider and the service ID list to the NF requester through a service discovery response. The FQDN is used to acquire an IP address of the NF provider.

In some embodiments, the FQDN includes a service ID. In some other embodiments, the FQDN includes, in addition to the service ID, a type of the NF provider, an ID of the NF provider, a type of UE connected to the NF requester, an ID of the UE, and an HPLMN ID of the UE.

Figure 5:
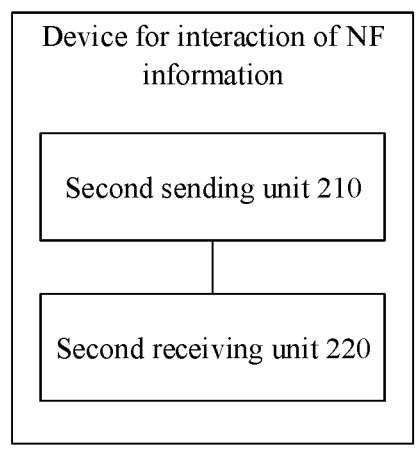
FIG. 5 is a structural diagram of a second device for interaction of NF information according to an embodiment of the disclosure.

As illustrated in FIG. 5, the present embodiment provides a device for interaction NF information, which is applied to an NF requester and includes a second sending unit 210 and a second receiving unit 220.

The second sending unit 210 is configured to send a service discovery request to an NRF. The service discovery request at least includes a service ID of a service requested by the NF requester.

The second receiving unit 220 is configured to receive at least one of an ID or service-related information of an NF provider, which is returned by the NRF based on the service discovery request. The service-related information is to indicate related information of a plurality of services provided by the NF provider.

The second sending unit 210 is further configured to send a service request to the NF provider based on the at least one of the ID or the service-related information of the NF provider.

The second receiving unit 220 is further configured to receive a service response returned by the NF provider based on the service request.

The second sending unit 210 and the second receiving unit 220 provided by the embodiments of the disclosure may correspond to communication interfaces of the NF requester.

The communication interface provided by the embodiment of the disclosure may be a wireless interface or a wired interface, and may be preferred to a wired interface. The wired interface has the characteristics of large transmission bandwidth and strong transmission stability.

In the present embodiment, the second sending unit 210 may correspond to a sending interface, and the second receiving unit 220 may correspond to a receiving interface.

The service information interaction device provided in the present embodiment determines, through the service discovery request and the service discovery response, an NF provider capable of providing an NF required by the NF requester, and obtains a corresponding NF by transmitting and receiving the service request and the service response.

In some embodiments, the second sending unit 210 is configured to acquire an IP address of the NF provider according to the ID of the NF provider, and send the service request to the determined IP address.

In the present embodiment, the second sending unit 210 obtains an IP address according to the ID of the NF provider and then accesses the corresponding NF provider according to the IP address.

Optionally, the service discovery request further includes predetermined information. The predetermined information includes at least one of related information of the NF provider, related information of the NF requester, or related information of a UE connected to the NF requester.

The related information of the NF provider includes at least one of a type of the NF provider or a type of a network slicing to which the NF provider belongs. The related information of the NF provider is used for the NRF to select an NF provider matching the related information of the NF provider.

The related information of the NF requester includes at least one of an ID of the NF requester, a type of the NF requester, or a type of a network slicing to which the NF requester belongs. The related information of the NF requester is used for the NRF to perform at least one of selecting an NF provider capable of providing a service for the NF requester and matching at least one of a capability or requirement of the NF requester, or determining service-related information of an NF authorized to be accessed by the NF requester. The service-related information of the NF authorized to be accessed by the NF requester is used for the NF provider to determine whether the service requested by the NF requester is an authorized service.

The related information of the UE includes at least one of an ID of the UE, a type of the UE, a type of a network slicing to which the UE is connected, an ID of a network slicing to which the UE is connected, an ID of an HPLMN where the UE is located, a name of a data network to which the UE is connected, or an ID of a data network to which the UE is connected. The related information of the UE is used for the NRF to select an NF provider capable of providing a service requested by the NF requester and matching at least one of a capability or requirement of the UE.

Optionally, the service-related information includes at least one of a service ID list or NF version information of the NF provider. The service ID list includes service IDs of all available services at the NF provider. The NF version information is to indicate versions of the services provided by the NF provider.

Several specific examples are provided below in connection with any of the above embodiments.

Example 1

Figure 6:
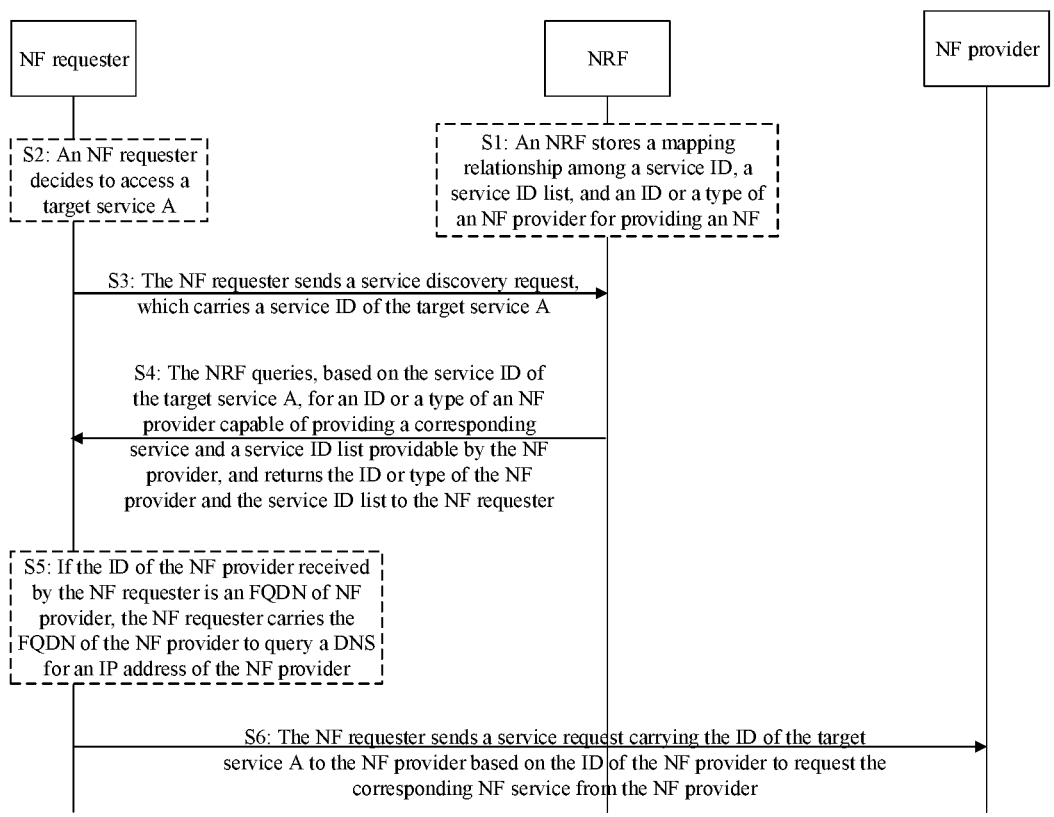
FIG. 6 is a flow diagram of a fourth method for interaction of NF information according to an embodiment of the disclosure.

As illustrated in FIG. 6, the present example provides a method for interaction of NF information, which includes the following operations.

In operation 51, an NRF stores a mapping relationship among a service ID, a service ID list, and an ID or a type of an NF provider for providing an NF.

In operation S2, an NF requester decides to access a target service A.

In operation S3, the NF requester sends a service discovery request; here, the service discovery request carries a service ID of the target service A (optionally, carrying the type of the NF provider).

In operation S4, the NRF queries, based on the service ID of the target service A, for an ID or a type of an NF provider capable of providing a corresponding service and a service ID list providable by the NF provider, and returns the ID or type of the NF provider and the service ID list to the NF requester.

In operation S5, if the ID of the NF provider received by the NF requester is an FQDN of the NF provider, the NF requester carries the FQDN of NF provider to query a DNS for an IP address of the NF provider. The FQDN may be constructed as a service ID (optionally, HPLMN ID, 3GPP.org; or, service ID, NF type/ID, HPLMN, or 3GPP.org), and otherwise operation S4 is performed directly.

In operation S6, the NF requester sends a service request carrying the ID of the target service A to the NF provider based on the ID of the NF provider to request the corresponding NF service from the NF provider.

Note: A service discovery request sent by the NF requester may carry service IDs of a plurality of services requested by the requester.

Example 2

Figure 7:
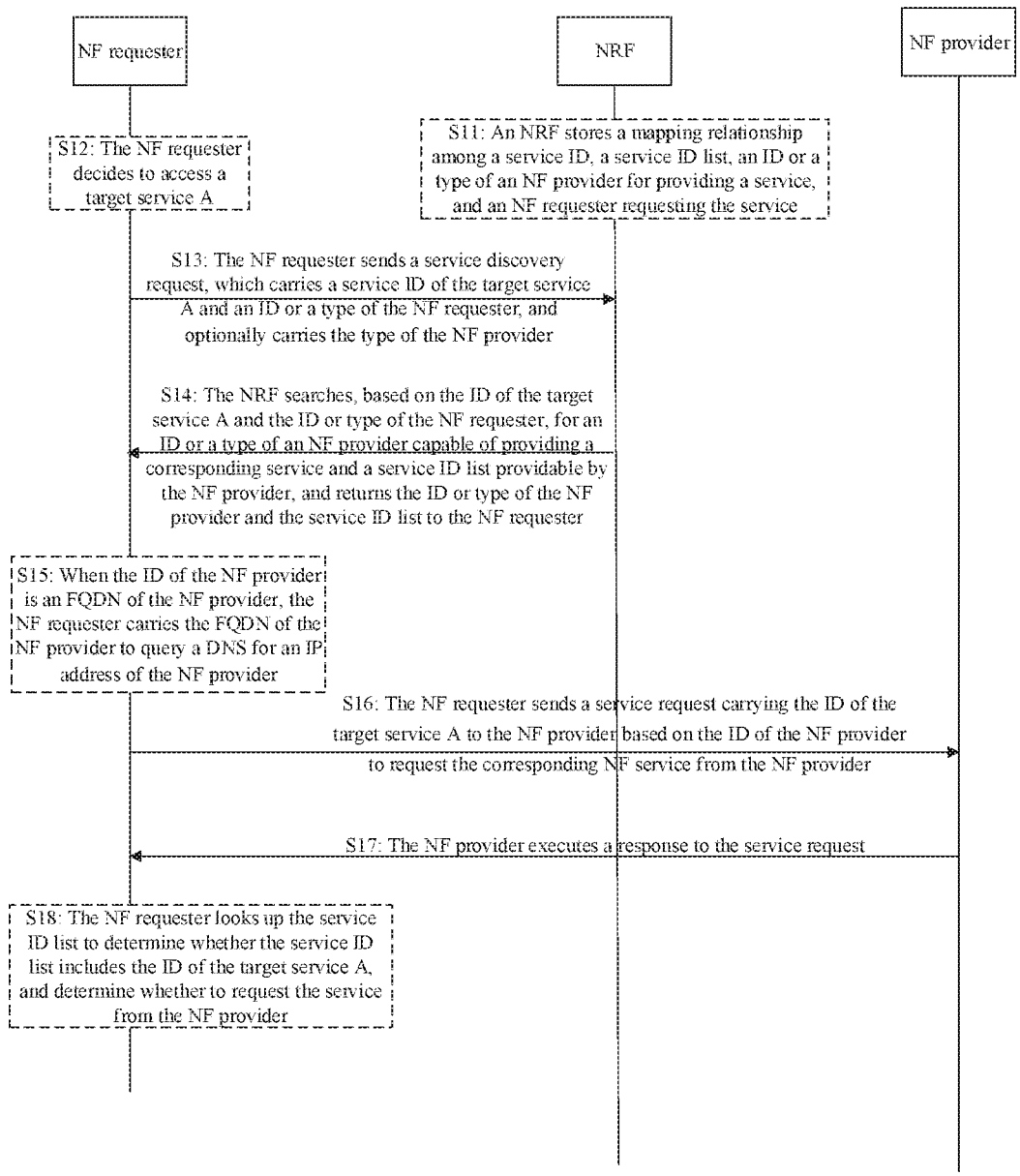
FIG. 7 is a flow diagram of a fifth method for interaction of NF information according to an embodiment of the disclosure.

As illustrated in FIG. 7, the present example provides a method for interaction of NF information, which includes the following operations.

In operation S11, an NRF stores a mapping relationship among a service ID, a service ID list, an ID or a type of an NF provider for providing a service, and an NF requester requesting the service.

In operation S12, the NF requester decides to access a target service A.

In operation S13, the NF requester sends a service discovery request. Here, the service discovery request carries a service ID of the target service A and an ID or type of the NF requester, and optionally carries the type of the NF provider.

In operation S14, the NRF searches, based on the ID of the target service A and the ID or type of the NF requester, for an ID or type of an NF provider capable of providing a corresponding service and a service ID list providable by the NF provider, and returns the ID or the type of the NF provider and the service ID list to the NF requester.

In operation S15, when the ID of the NF provider is an FQDN of the NF provider, the NF requester carries the FQDN of the NF provider to query a DNS for an IP address of the NF provider.

In operation S16, the NF requester sends a service request carrying the ID of the target service A to the NF provider based on the ID of the NF provider to request the corresponding NF service from the NF provider.

In operation S17, the NF provider executes a response to the service request.

In operation S18, the NF requester looks up the service ID list to determine whether the service ID list includes the ID of the target service A, and determine whether to request a service from the NF provider.

Example 3

Figure 8:
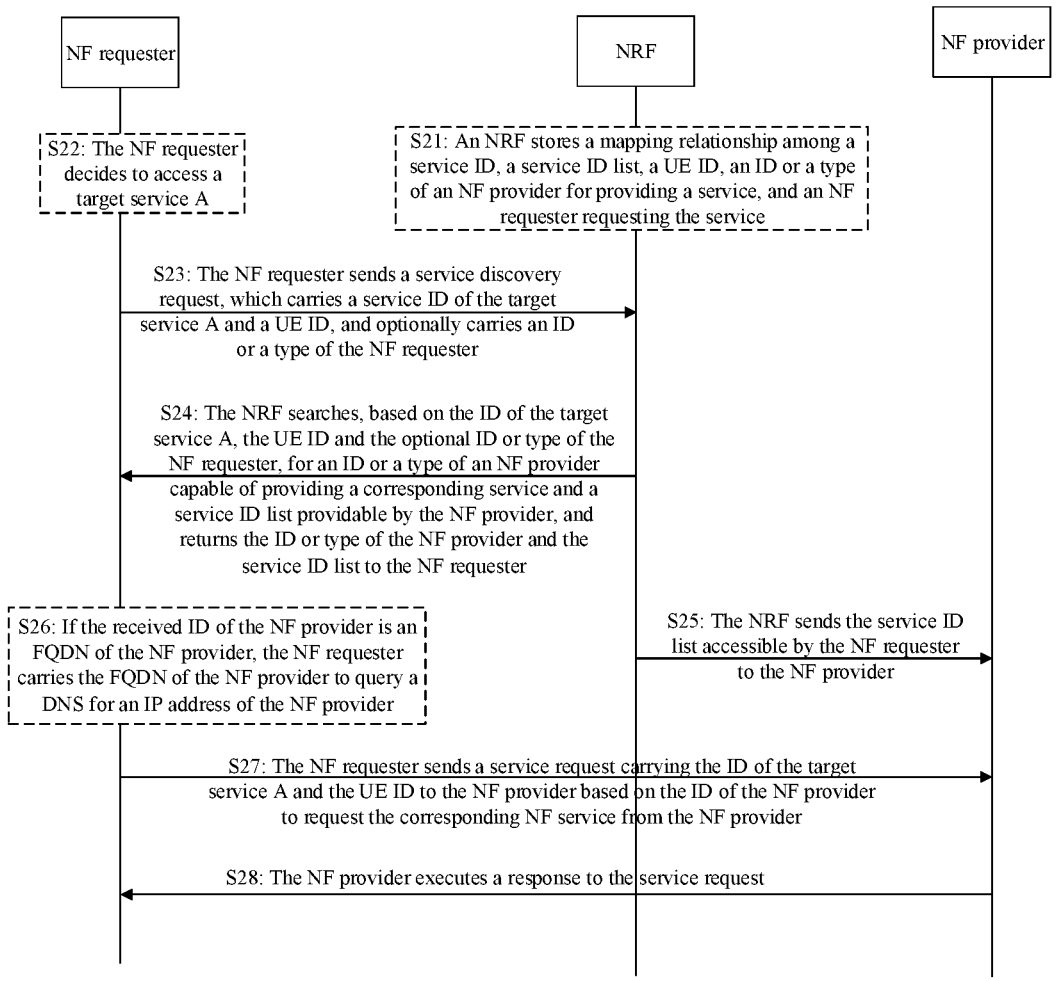
FIG. 8 is a flow diagram of a sixth method for interaction of NF information according to an embodiment of the disclosure.

As illustrated in FIG. 8, the present example provides a method for interaction of NF information, which includes the following operations.

In operation S21, an NRF stores a mapping relationship among a service ID, a service ID list, a UE ID, an ID or a type of an NF provider for providing a service, and an NF requester requesting the service (optionally, the mapping relationship includes an ID or type of the NF requester).

In operation S22, the NF requester decides to access a target service A.

In operation S23, the NF requester sends a service discovery request. Here, the service discovery request carries a service ID of the target service A and a UE ID, and optionally carries an ID or type of the NF requester (optionally carries the type of the NF provider).

In operation S24, the NRF searches, based on the ID of the target service A, the UE ID and the optional ID or type of the NF requester, for an ID or type of an NF provider capable of providing a corresponding service and a service ID list providable by the NF provider, and returns the ID or the type of the NF provider and the service ID list to the NF requester.

In operation S25, the NRF sends the service ID list accessible by the NF requester to the NF provider.

In operation S26, if the received ID of the NF provider is an FQDN of the NF provider, the NF requester carries the FQDN of the NF provider to query a DNS for an IP address of the NF provider. The FQDN may be constructed to include UE ID, a service ID (optionally, HPLMN ID) and 3GPP.org, or include UE ID and a service ID. The FQDN may further include: NF type/ID, HPLMN and 3GPP.org.

In operation S27, the NF requester sends a service request carrying the ID of the target service A and the UE ID to the NF provider based on the ID of the NF provider to request the corresponding NF service from the NF provider In some scenarios, the NF provider searches, based on the received service ID list, the UE ID and the optional ID or type of the NF requester, the service ID list to determine whether the service ID list includes the ID of the target service A, and determine whether to provide a service for a UE of the NF requester. If yes, the service can be requested.

In operation S28, the NF provider executes a response to the service request.

The embodiments of the disclosure further provide a computer storage medium. The computer storage medium stores a computer executable instruction such as a computer program or an application program. After the computer executable instruction is executed by a processor, the NF information interaction method provided by one or more of the foregoing technical solutions, for example, one or more of the NF information interaction methods illustrated in FIG. 1 to FIG. 3 or FIG. 6 to FIG. 8 can be performed.

The computer storage medium may include: various media capable of storing program codes, such as a mobile storage device, a read-only memory (ROM), a random access memory (RAM), a magnetic disk, or an optical disk. Optionally, the computer storage medium may be a non-transitory storage medium.

In several embodiments provided by the present application, it is to be understood that the disclosed devices and methods may be implemented in other manners. The device embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed between various components may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be all integrated into one processing module, or each unit may exist physically separately, or two or more units may be integrated into one unit. The integrated unit may be implemented in the form of hardware or in the form of hardware and software functional units.

Those of ordinary skill in the art may understand that all or part of the operations implementing the above method embodiment may be completed through a hardware related to a program instruction. The foregoing program may be stored in a computer-readable storage medium, and when the program is executed, the operations including the above method embodiment are performed.

The above is only the specific implementation of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of the claims.

INDUSTRIAL APPLICABILITY

In the embodiments of the disclosure, at least two antennas are disposed in a mobile terminal. The first antenna is a main antenna, the second antenna is an auxiliary antenna. The first antenna and the second antenna are diagonally placed in the mobile terminal. The external radiated power of the first antenna in the communication process of the mobile terminal is detected in real time; and the mobile terminal is controlled to communicate using the first antenna or the second antenna according to the external radiated power, thus reducing the SAR of the mobile terminal during communication, and also reducing the electromagnetic radiation of the mobile terminal to a human body.

The invention claimed is:

1. A method for interaction of network function (NF) information, comprising:
receiving, by a network repository function (NRF), a service discovery request from an NF requester, wherein the service discovery request comprises a service identifier (ID) of a service requested by the NF requester;
querying, based on the service ID, for at least one of an ID of an NF provider capable of providing the service requested by the NF requester or service-related information of the NF provider capable of providing the service requested by the NF requester, wherein the service-related information is to indicate related information of a plurality of services provided by the NF provider; and
sending at least one of the ID of the NF provider or the service-related information to the NF requester through a service discovery response.

2. The method of claim 1, wherein
the service discovery request further comprises predetermined information, wherein the predetermined information comprises related information of the NF provider, wherein the related information of the NF provider comprises at least one of a type of the NF provider or a type of a network slicing to which the NF provider belongs; and
querying, based on the service ID, for at least one of the ID of the NF provider capable of providing the service requested by the NF requester or the service-related information of the NF provider capable of providing the service requested by the NF requester comprises:
determining, based on the service ID and the related information of the NF provider, an NF provider capable of providing the service requested by the NF requester and matching the related information of the NF provider.

3. The method of claim 1, wherein
the service discovery request further comprises predetermined information, wherein the predetermined information comprises at least one of related information of the NF requester or related information of a user equipment (UE) connected to the NF requester, wherein the related information of the NF requester comprises at least one of an ID of the NF requester, a type of the NF requester, or a type of a network slicing to which the NF requester belongs;
the related information of the UE comprises at least one of an ID of the UE, a type of the UE, a type of a network slicing to which the UE is connected, an ID of a network slicing to which the UE is connected, an ID of a home public land mobile network (HPLMN) where the UE is located, a name of a data network to which the UE is connected, or an ID of a data network to which the UE is connected;
querying, based on the service ID, for at least one of the NF provider capable of providing the service requested by the NF requester or the service-related information of the NF provider capable of providing the service requested by the NF requester comprises:
querying, based on the service ID and the related information of the NF requester, an NF provider capable of providing the service requested by the NF requester and matching the predetermined information.

4. The method of claim 3, wherein the method further comprises:
determining, based on the predetermined information, service-related information of an NF authorized to be accessed by the NF requester, wherein the service-related information of the NF authorized to be accessed by the NF requester is used for the NF provider to determine whether the service requested by the NF requester is an authorized service; and
sending the service-related information of the NF authorized to be accessed by the NF requester to the NF provider.

5. The method of claim 1, wherein sending at least one of the ID of the NF provider or the service-related information to the NF requester through the service discovery response comprises:
sending a fully qualified domain name (FQDN) of the NF provider and the service-related information to the NF requester through the service discovery response, wherein the FQDN is used to acquire an internet protocol (IP) address of the NF provider.

6. The method of claim 5, wherein
the FQDN comprises: a service ID; or,
the FQDN comprises a service ID and at least one of a type of the NF provider, an ID of the NF provider, a type of a UE connected to the NF requester, an ID of the UE, or an HPLMN ID of the UE.

7. The method of claim 1, wherein
the service-related information comprises at least one of a service ID list or NF version information of the NF provider, wherein the service ID list comprises service IDs of all available services at the NF provider, and the NF version information is to indicate versions of the services provided by the NF provider.

8. The method of claim 1, wherein sending at least one of the ID of the NF provider or the service-related information to the NF requester through the service discovery response comprises:
sending an IP address of the NF provider and the service-related information to the NF requester through the service discovery response.

9. A method for interaction of network function (NF) information, comprising:

sending, by an NF requester, a service discovery request to a network repository function (NRF), wherein the service discovery request comprises a service identifier (ID) of a service requested by the NF requester;

receiving at least one of an ID or service-related information of an NF provider, which is returned by the NRF based on the service discovery request, wherein the service-related information is to indicate related information of a plurality of services provided by the NF provider;

sending a service request to the NF provider based on at least one of the ID or the service-related information of the NF provider; and receiving a service response returned by the NF provider based on the service request.

10. The method of claim 9, wherein when the ID of the NF provider is received, sending the service request to the NF provider based on at least one of the ID or the service-related information of the NF provider comprises:

acquiring an internet protocol (IP) address of the NF provider based on the ID of the NF provider; and sending the service request to the NF provider based on the IP address.

11. The method of claim 9, wherein the service discovery request further comprises predetermined information, wherein the predetermined information comprises at least one of related information of the NF provider, related information of the NF requester, or related information of a user equipment (UE) connected to the NF requester;

the related information of the NF provider comprises at least one of a type of the NF provider or a type of a network slicing to which the NF provider belongs, wherein the related information of the NF provider is used for the NRF to select an NF provider matching the related information of the NF provider;

the related information of the NF requester comprises at least one of an ID of the NF requester, a type of the NF requester, or a type of a network slicing to which the NF requester belongs, wherein the related information of the NF requester is used for the NRF to perform at least one of selecting an NF provider capable of providing a service for the NF requester and matching at least one of a capability or requirement of the NF requester, or determining service-related information of an NF authorized to be accessed by the NF requester, wherein the service-related information of the NF authorized to be accessed by the NF requester is used for the NF provider to determine whether the service requested by the NF requester is an authorized service; and the related information of the UE comprises at least one of an ID of the UE, a type of the UE, a type of a network slicing to which the UE is connected, an ID of a network slicing to which the UE is connected, an ID of a home public land mobile network (HPLMN) where the UE is located, a name of a data network to which the UE is connected, or an ID of a data network to which the UE is connected, wherein the related information of the UE is used for the NRF to select an NF provider capable of providing a service requested by the NF requester and matching at least one of a capability or requirement of the UE.

12. The method of claim 10, wherein the service-related information comprises at least one of a service ID list or NF version information of the NF provider, wherein the service ID list comprises service IDs of all available services at the NF provider, and the NF version information is to indicate versions of the services provided by the NF provider.

13. A network repository function (NRF), comprising a communication interface and a processor, wherein the communication interface is configured to receive a service discovery request from an NF requester, wherein the service discovery request comprises a service identifier (ID) of a service requested by the NF requester;

the processor is configured to query, based on the service ID, for at least one of an ID of an NF provider capable of providing the service requested by the NF requester or service-related information of the NF provider capable of providing the service requested by the NF requester, wherein the service-related information is to indicate related information of a plurality of services provided by the NF provider; and the communication interface is further configured to send at least one of the ID of the NF provider or the service-related information to the NF requester through a service discovery response.

14. The NRF of claim 13, wherein the service discovery request further comprises related information of the NF provider, wherein the related information of the NF provider comprises at least one of a type of the NF provider or a type of a network slicing to which the NF provider belongs; and the processor is specifically configured to determine, based on the service ID and the related information of the NF provider, an NF provider capable of providing the service requested by the NF requester and matching the related information of the NF provider.

15. The NRF of claim 13, wherein the service discovery request further comprises predetermined information, wherein the predetermined information comprises at least one of related information of the NF requester or related information of a user equipment (UE) connected to the NF requester, wherein the related information of the NF requester comprises at least one of an ID of the NF requester, a type of the NF requester, or a type of a network slicing to which the NF requester belongs;

the related information of the UE comprises at least one of an ID of the UE, a type of the UE, a type of a network slicing to which the UE is connected, an ID of a network slicing to which the UE is connected, an ID of a home public land mobile network (HPLMN) where the UE is located, a name of a data network to which the UE is connected, or an ID of a data network to which the UE is connected; and the processor is specifically configured to query, based on the service ID and the related information of the NF requester, an NF provider capable of providing a service requested by the NF requester and matching the predetermined information.

16. The NRF of claim 15, wherein the processor is further configured to determine, based on the predetermined information, service-related information of an NF authorized to be accessed by the NF requester, wherein the service-related information of the NF authorized to be accessed by the NF requester is used for the NF provider to determine whether the service requested by the NF requester is an authorized service; and the communication interface is further configured to send the service-related information of the NF authorized to be accessed by the NF requester to the NF provider.

17. The NRF of claim 13, wherein
the communication interface is configured to send a fully qualified domain name (FQDN) of the NF provider and the service-related information to the NF requester through the service discovery response, wherein the FQDN is used to acquire an internet protocol (IP) address of the NF provider.

18. The NRF of claim 13, wherein
the communication interface is configured to send an IP address of the NF provider and the service-related information to the NF requester through the service discovery response.

19. A of network function (NF) NF requester, comprising:
a communication interface, configured to:
   send a service discovery request to a network repository function (NRF), wherein the service discovery request comprises a service identifier (ID) of a service requested by the NF requester;
   receive at least one of an ID or service-related information of an NF provider, which is returned by the NRF based on the service discovery request, wherein the service-related information is to indicate related information of a plurality of services provided by the NF provider;
   send a service request to the NF provider based on at least one of the ID or the service-related information of the NF provider; and
   receive a service response returned by the NF provider based on the service request.

20. The NF requester of claim 19, wherein when the ID of the NF provider is received,
the communication interface is configured to acquire an internet protocol (IP) address of the NF provider based on the ID of the NF provider, and send the service request to the NF provider based on the IP address.

\* \* \* \* \*

UNITED STATES PATENT AND TRADEMARK OFFICE
CERTIFICATE OF CORRECTION

PATENT NO.           : 10,924,558 B2                                  Page 1 of 1
APPLICATION NO.      : 16/496000
DATED                : February 16, 2021
INVENTOR(S)          : Cai et al.

It is certified that error appears in the above-identified patent and that said Letters Patent is hereby corrected as shown below:

In the Claims

Claim 19, Line 1:
"A of network function (NF) NF requestor, comprising:" should be replaced with --A network function (NF) requestor, comprising:--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*